United States Patent
Smith

(10) Patent No.: US 12,128,808 B2
(45) Date of Patent: Oct. 29, 2024

(54) CUPHOLDER FOR A JUVENILE SEAT

(71) Applicant: Dorel Juvenile Group, Inc., Foxboro, MA (US)

(72) Inventor: Cory R. Smith, Bridgewater, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 114 days.

(21) Appl. No.: 17/948,613

(22) Filed: Sep. 20, 2022

(65) Prior Publication Data
US 2023/0086257 A1    Mar. 23, 2023

Related U.S. Application Data

(60) Provisional application No. 63/246,392, filed on Sep. 21, 2021.

(51) Int. Cl.
*B60N 3/10* (2006.01)
*B60N 2/28* (2006.01)

(52) U.S. Cl.
CPC .............. *B60N 3/103* (2013.01); *B60N 2/28* (2013.01); *B60N 3/106* (2013.01)

(58) Field of Classification Search
CPC .... B60N 3/102–103; B60N 3/105–106; B60N 2/2866; B60N 2/26; B62B 2202/023; A47G 23/0216
USPC ............................................ 248/311.2, 312.1
See application file for complete search history.

(56) References Cited

U.S. PATENT DOCUMENTS

| | | | | |
|---|---|---|---|---|
| 4,801,060 A | * | 1/1989 | Thompson | B60N 3/103 224/544 |
| 5,170,980 A | * | 12/1992 | Burrows | B60N 3/101 224/483 |
| 5,285,953 A | * | 2/1994 | Smith | A47G 23/0216 220/737 |
| 6,315,153 B1 | * | 11/2001 | Osborn | A47G 23/0216 220/737 |
| 7,036,784 B2 | | 5/2006 | Peitzmeier | |
| 7,731,144 B2 | | 6/2010 | Kazyaka | |
| 7,748,678 B2 | | 7/2010 | Camarota | |
| 8,469,246 B2 | * | 6/2013 | Lee | B60N 3/102 224/282 |
| 9,016,651 B2 | * | 4/2015 | Webb | A47G 23/0225 248/311.2 |
| 9,248,770 B2 | * | 2/2016 | Brinas | B60N 3/101 |
| 9,452,701 B1 | | 9/2016 | Allen | |
| 9,803,681 B2 | | 10/2017 | Esposito | |
| 10,023,092 B2 | * | 7/2018 | Denbo | B60N 2/28 |
| 10,059,244 B2 | * | 8/2018 | Lombardi | B60N 2/28 |
| 10,183,603 B2 | * | 1/2019 | Jaradi | B60N 2/79 |
| 10,279,723 B2 | | 5/2019 | Gaudreau, Jr. | |
| 10,300,826 B2 | | 5/2019 | Denbo | |
| 10,596,946 B1 | | 3/2020 | Huntley | |
| 10,611,286 B2 | * | 4/2020 | Denbo | B60N 2/28 |
| 10,687,644 B1 | | 6/2020 | Moore | |

(Continued)

*Primary Examiner* — Ingrid M Weinhold
(74) *Attorney, Agent, or Firm* — Barnes & Thornburg LLP

(57) ABSTRACT

A juvenile seat includes a seat bottom and a cupholder support coupled to the seat bottom. The juvenile seat further includes a cupholder coupled removably to the cupholder support. The cupholder includes a cupholder mount coupled to the cupholder support to retain the cupholder to the cupholder support and a cupholder base at least partially defining an interior container-receiving space.

19 Claims, 6 Drawing Sheets

(56) References Cited

U.S. PATENT DOCUMENTS

| | | |
|---|---|---|
| 10,773,628 B1 | 9/2020 | Super |
| 10,874,236 B1 | 12/2020 | Allen |
| 11,046,228 B2 * | 6/2021 | Shin ................... B60N 3/106 |
| D977,917 S * | 2/2023 | Guo ............................ D7/619.1 |
| 2005/0001127 A1 * | 1/2005 | Schaal ................. B60N 3/102 |
| | | 248/311.2 |
| 2016/0059762 A1 * | 3/2016 | Poirier ................. B60N 3/102 |
| | | 248/311.2 |
| 2017/0259720 A1 * | 9/2017 | Lombardi ............... B62B 7/145 |

* cited by examiner

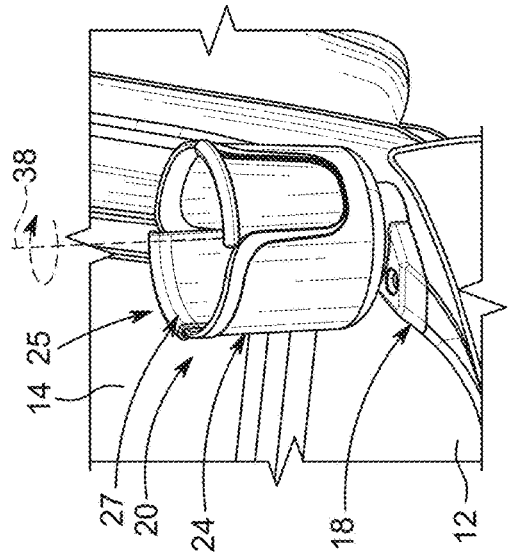
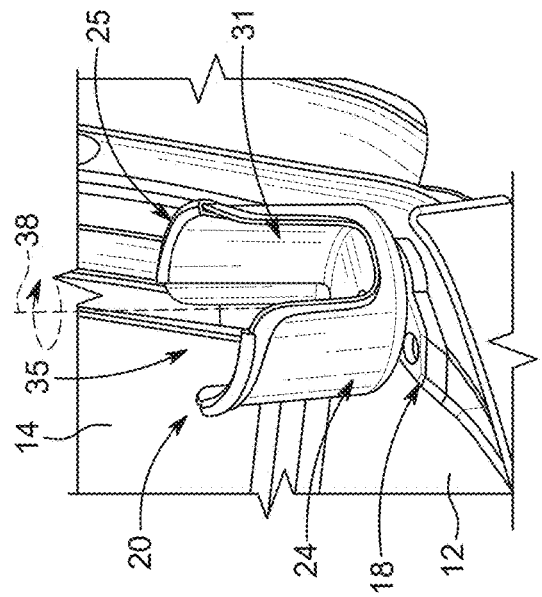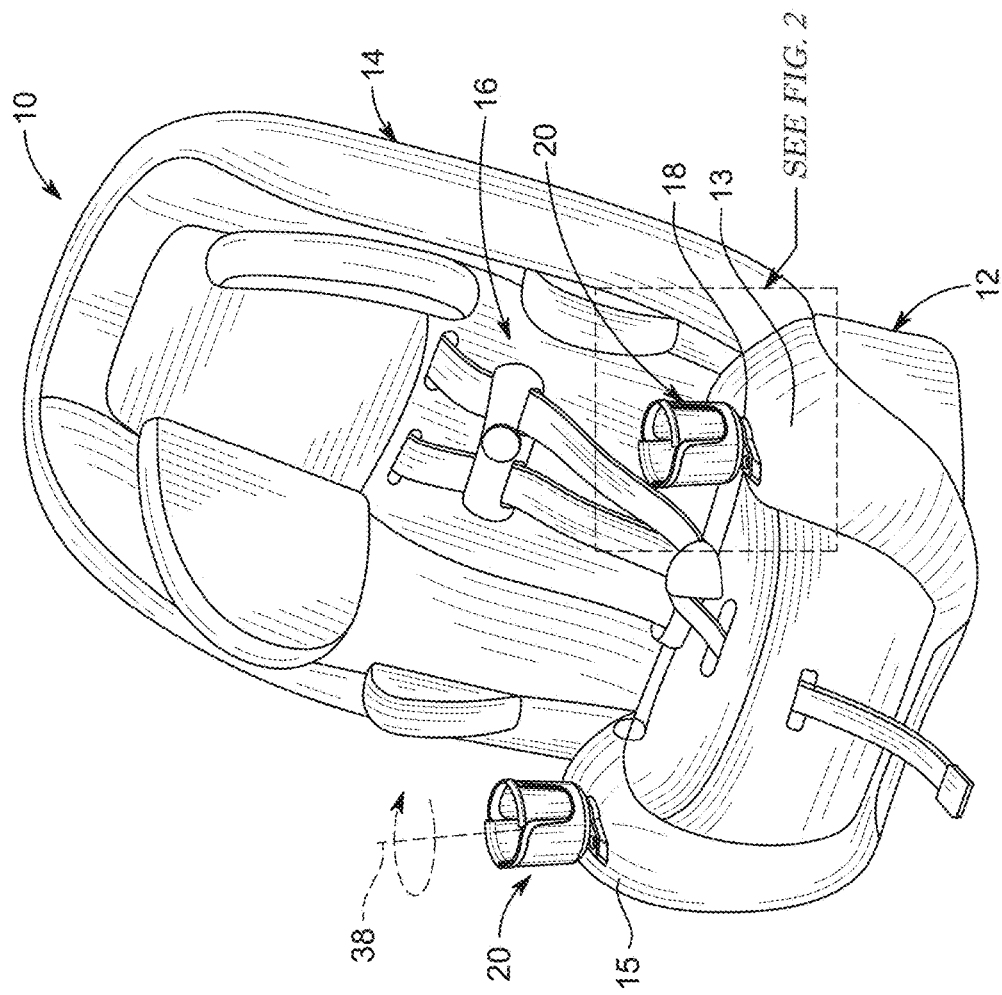

CUPHOLDER FOR A JUVENILE SEAT

PRIORITY CLAIM

This application claims priority under 35 U.S.C. § 119(e) to U.S. Provisional Application Ser. No. 63/246,392, filed Sep. 21, 2021, which is expressly incorporated by reference herein.

BACKGROUND

The present disclosure relates to child restraints, and in particular to juvenile seats for use on passenger seats in vehicles. More particularly, the present disclosure relates to a cupholder included in a juvenile seat.

SUMMARY

According to the present disclosure, a juvenile seat includes a seat bottom and a seat back extending upwardly from the seat bottom. The seat bottom includes a pair of side bolsters arranged to lie on opposite sides of the seat bottom from one another.

In illustrative embodiments, the juvenile seat further includes a cupholder support coupled to each of the bolsters of the seat bottom and a cupholder coupled removably with each cupholder support. The cupholder support may be formed integrally with one or both of the seat bottom and the seat back or secured by one or more fasteners or other attachment means. The cupholders are separable from each corresponding cupholder support and include a cupholder mode-changer that allows the cupholder to be changed between a volume-maximizing mode and a handle-receiving mode depending on what item(s) are intended to be held in the cupholder.

In illustrative embodiments, the cupholder mode-changer is oriented so that the cupholder has a continuous cupholder sidewall in the volume-maximizing mode to maximize a volume of an interior space provided by the cupholder. The cupholder mode-changer is oriented to provide at least one handle-receiving space in the cupholder in the handle-receiving mode to receive a handle of a container so that the container fits securely in the interior space and accommodates the handle in the handle-receiving space.

In illustrative embodiments, the cupholder includes a cupholder mount, a cupholder base, and the cupholder mode-changer. The cupholder mount is coupled to a lower end of the cupholder base and arranged to extend into a mount aperture formed in the cupholder support. The cupholder base is formed to include the interior space which is configured to receive the cupholder mode-changer and items therein. The cupholder mode-changer is pivotable and/or rotatable relative to the cupholder base about a vertical axis to change the cupholder between the volume-maximizing mode and the handle-receiving mode.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a juvenile seat including a seat bottom, a seat back arranged to extend upwardly from the seat bottom, and a cupholder configured to be mounted to the seat bottom;

FIG. 2 is an enlarged perspective view of one of the cupholders shown in FIG. 1 arranged in a volume-maximizing mode where the cupholder has a continuous cupholder sidewall that extends circumferentially around a vertical axis of the cupholder;

FIG. 3 is a perspective view similar to FIG. 2 showing the cupholder in a handle-receiving mode after movement of a cupholder mode-changer to open a handle-receiving space in the continuous sidewall of the cupholder so that containers having handles can be placed into an interior container-receiving space without the handle being blocked by the cupholder sidewall;

Figure 4:
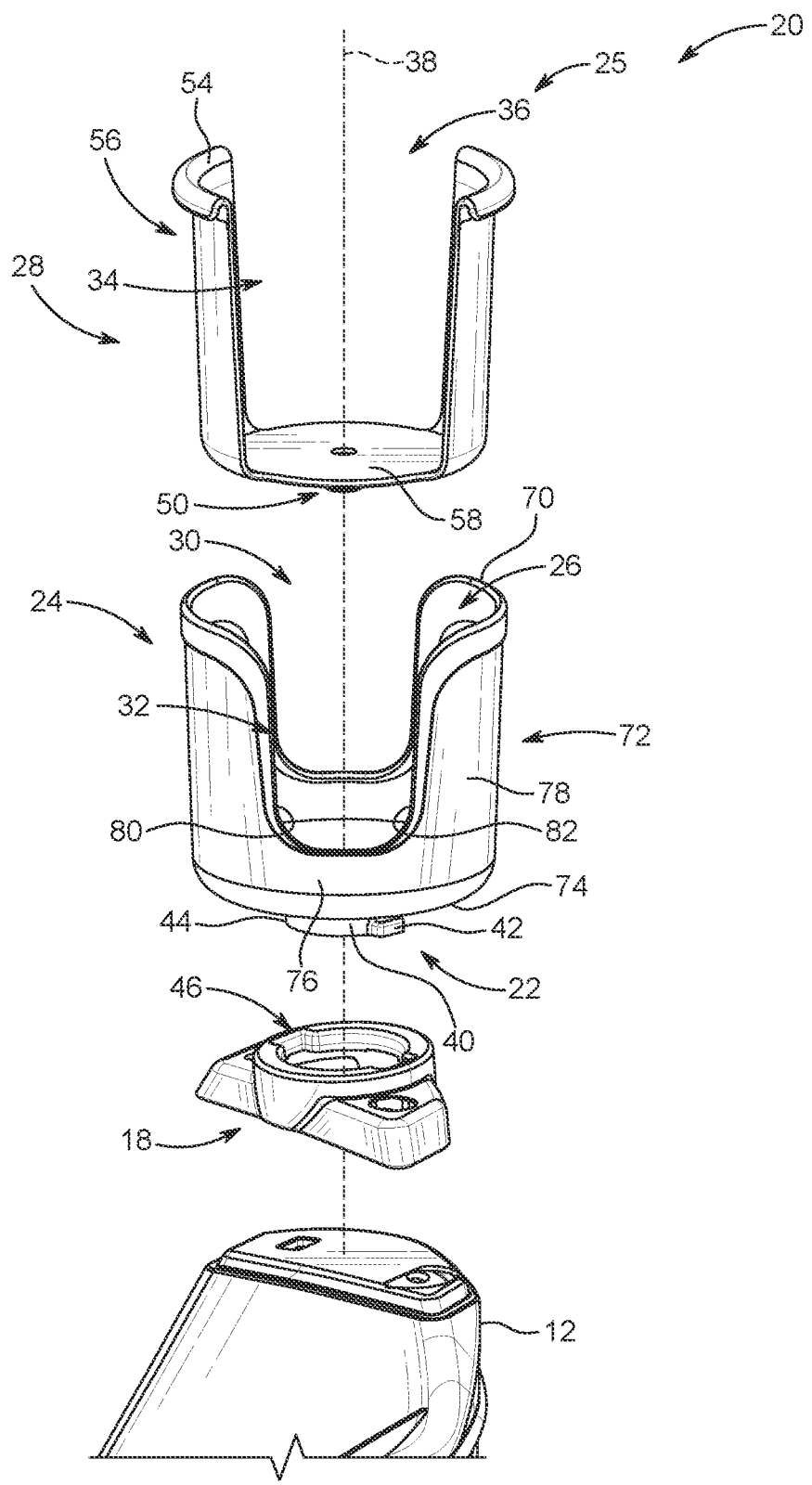
Figure 5:
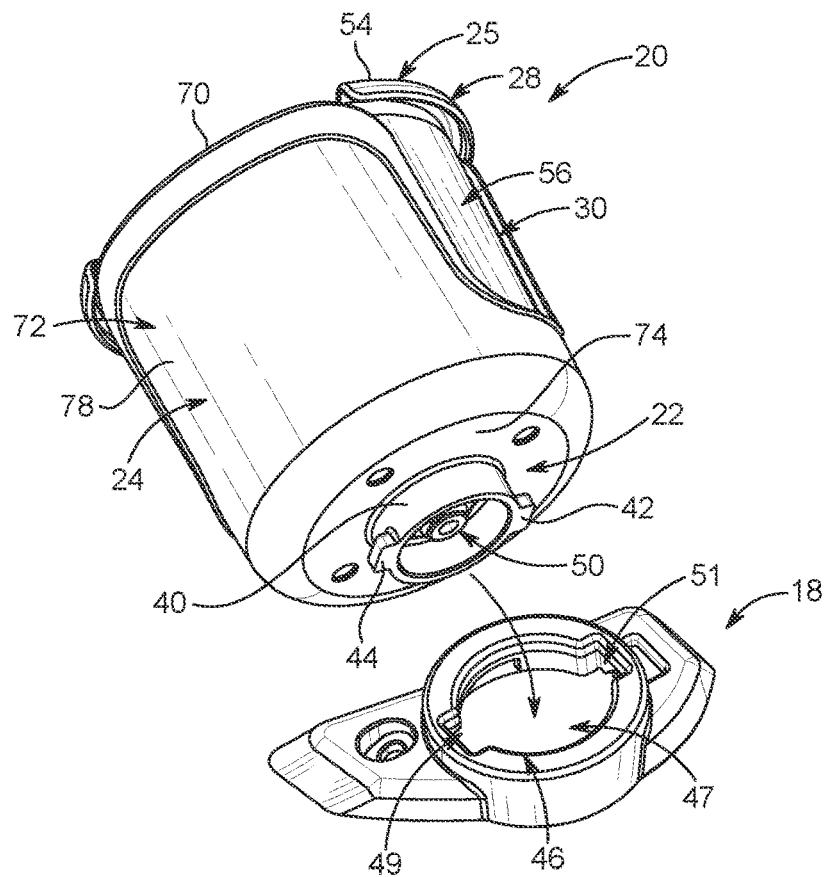
Figure 6:
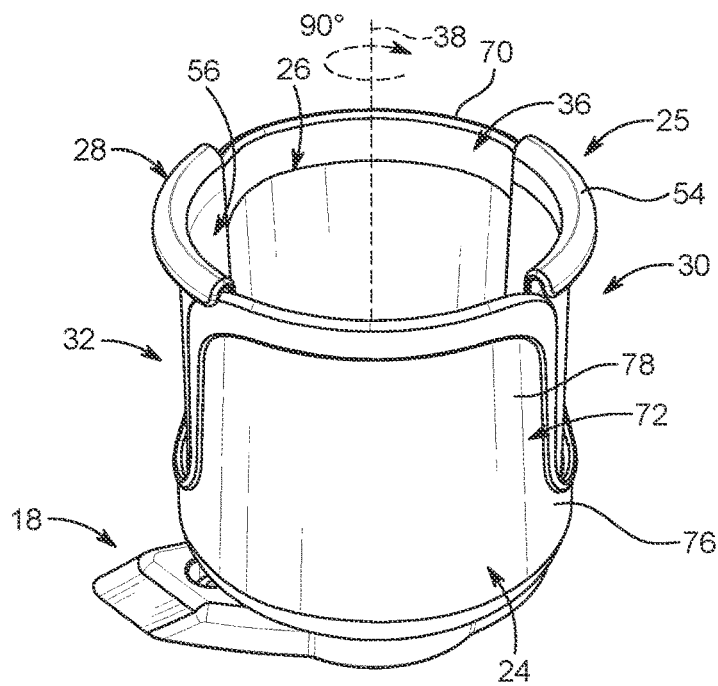
Figure 7:
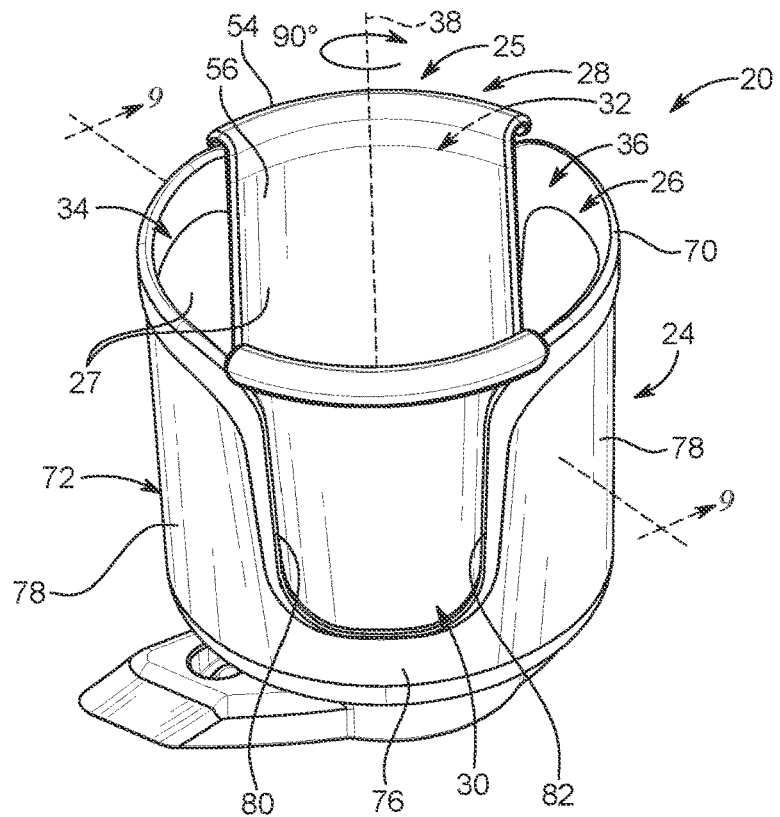
Figure 8:
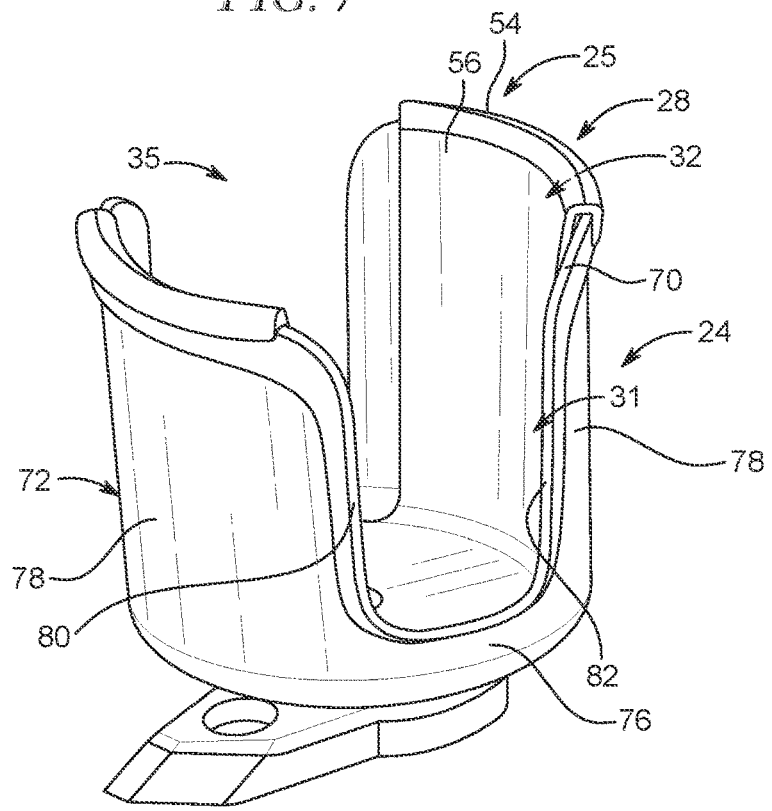
Figure 9:
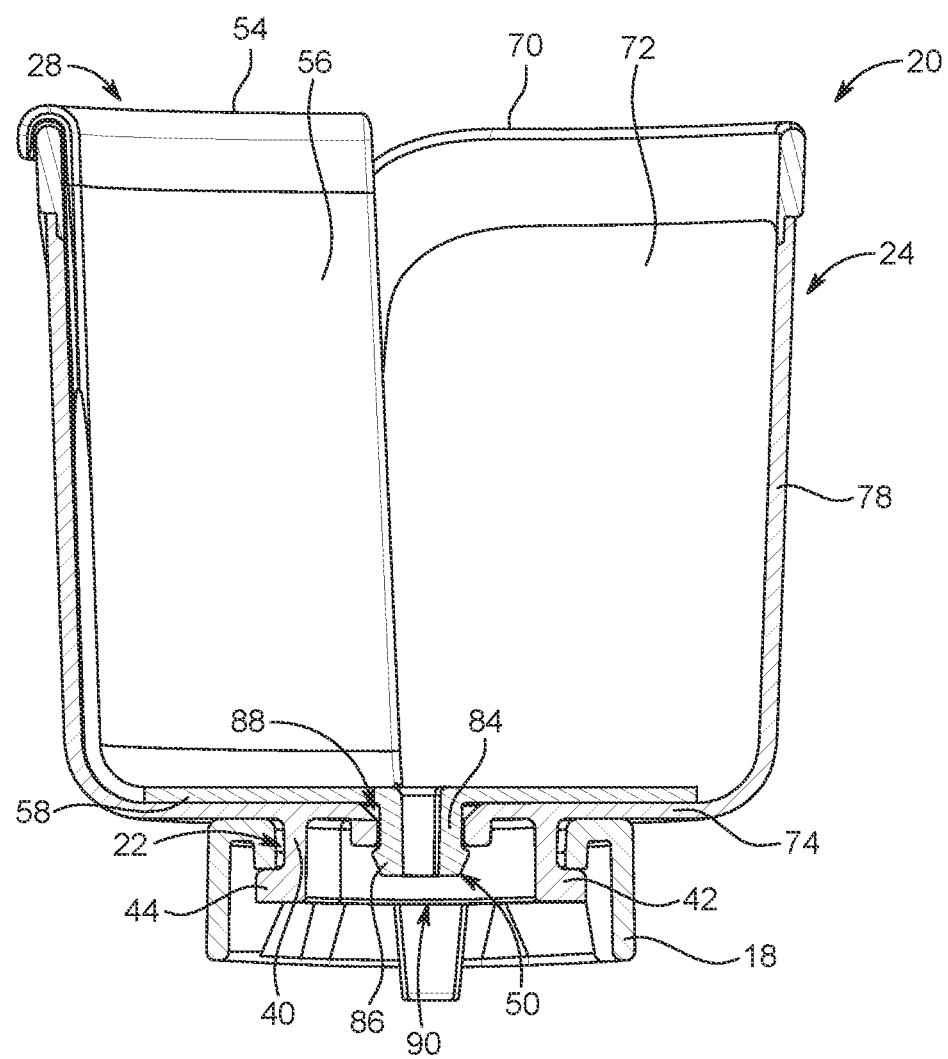
Figure 10:
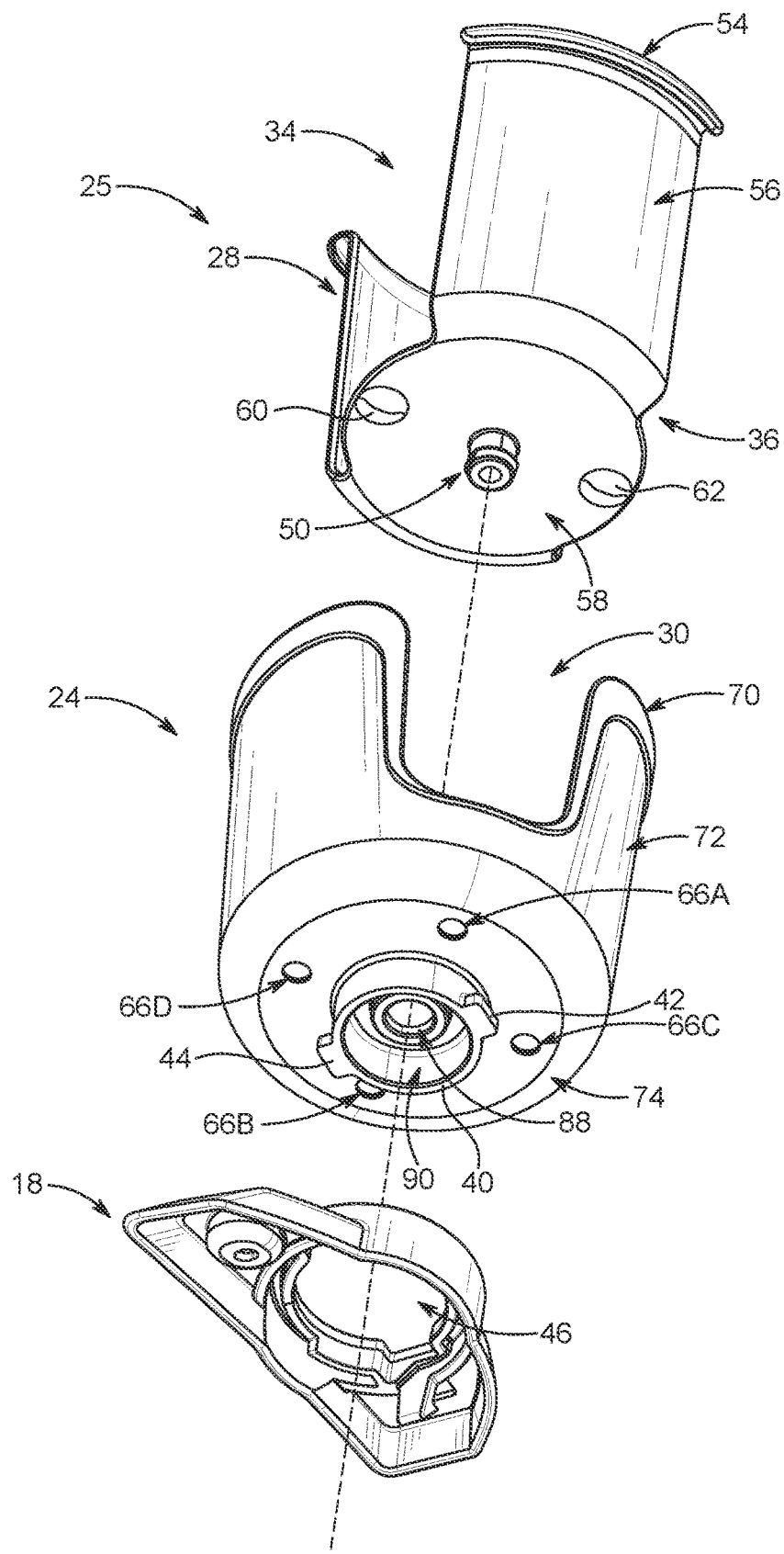

FIG. 4 is an exploded assembly view of the cupholder from FIGS. 1-3 showing, from bottom to top, a cupholder support, a cupholder base configured to be secured to the cupholder support, and the cupholder mode-changer configured to couple to the cupholder mode-changer and to cooperate with the cupholder base to provide means for establishing the continuous cupholder sidewall in the volume-maximizing mode and for establishing the handle-receiving space in the handle-receiving mode;

FIG. 5 is a perspective view of the cupholder support and the cupholder separated from the cupholder support showing that the cupholder base includes a cupholder mount and the cupholder support is formed to include a mount aperture that corresponds in shape to the cupholder mount so that the cupholder mount can be inserted through the mount aperture, as shown in FIG. 6, and then rotated about the vertical axis to interlock the cupholder mount with the cupholder support, as shown in FIG. 7;

FIG. 6 is a perspective view of the cupholder mounted on the cupholder support and prior to rotating the cupholder about the vertical axis;

FIG. 7 is a perspective view of the cupholder after being rotated 90 degrees about the vertical axis to interlock the cupholder mount with the cupholder support;

FIG. 8 is a perspective view of the cupholder in the handle-receiving mode;

FIG. 9 is a cross section of the cupholder taken along line 9-9 in FIG. 7 showing that the cupholder mount is formed to provide a hollow cavity and to show that the cupholder mode-changer includes a cupholder insert and an insert mount configured to extend through a mount aperture opening into the hollow cavity; and FIG. 10 is an exploded assembly view of the cupholder showing that the cupholder insert includes a pair of detent protrusions and the cupholder base is formed to include a plurality of detent openings which receive the detent protrusions in the volume-maximizing mode and in the handle-receiving mode to block movement of the cupholder insert relative to the cupholder base.

DETAILED DESCRIPTION

A juvenile seat 10 includes a seat bottom 12 and a seat back 14 coupled to the seat bottom 12 and arranged to extend upwardly away from the seat bottom 12 as shown in FIG. 1. The seat bottom 12 and the seat back 14 cooperate to provide a child-receiving space 16. The seat bottom 12 includes a pair of bolsters 13, 15 positioned in laterally spaced apart relation to one another on each side of the seat bottom 12.

The juvenile seat 10 further includes a cupholder support 18 coupled to each of the bolsters 13, 15 of the seat bottom 12 and a cupholder 20 coupled removably with each cupholder support 18 as shown in FIG. 1. The cupholder support 18 may be formed integrally with one or both of the seat bottom 12 and the seat back 14 or secured by one or more fasteners or other attachment means. The cupholders 20 are separable from each corresponding cupholder support 18 and include a cupholder mode-changer 25 that allows the cupholder 20 to be changed between a volume-maximizing mode, as shown in FIG. 2, and a handle-receiving mode, as shown in FIG. 3, depending on what item(s) are intended to be held in the cupholder 20.

In the volume-maximizing mode, the cupholder mode-changer 25 is oriented so that the cupholder 20 has a continuous cupholder sidewall 27 to maximize a volume of an interior space 26 provided by the cupholder 20. In one example, food products or a bottle without a handle can be held in the interior space 26 in the volume-maximizing mode. In the handle-receiving mode, the cupholder mode-changer 25 is oriented to provide at least one handle-receiving space 31, 35 in the cupholder 20 to receive a handle of a container so that the container fits securely in the interior space 26 and accommodates the handle in the handle-receiving space 31, 35. Although the cupholder 20 in the illustrative embodiment is attached to a juvenile seat 10 and is adapted to be used in a vehicle, the cupholder 20 may be coupled to other types of child restraints such as a stroller, a bouncer, a child play pen, etc.

Both cupholders 20 are substantially similar, and only one cupholder 20 is described herein. The cupholder 20 includes a cupholder mount 22, a cupholder base 24, and the cupholder mode-changer 25 as shown in FIGS. 2-4. The cupholder mount 22 is coupled to a lower end of the cupholder base 24 and arranged to extend into a mount aperture 46 formed in the cupholder support 18. The cupholder base 24 is formed to include the interior space 26 which is configured to receive the cupholder mode-changer 25 and items therein. The cupholder mode-changer 25 is pivotable relative to the cupholder base 24 about a vertical axis 38 to change the cupholder 20 between the volume-maximizing mode and the handle-receiving mode.

The cupholder mount 22 is configured to interlock with the cupholder support 18 to retain the cupholder 20 to the cupholder support 18 as suggested in FIGS. 5-7. The cupholder mount 22 provides a twist lock for the cupholder 20 and includes a mount ring 40 and a pair of retainer tabs 42, 44 coupled to the mount ring 40. The mount ring 40 extends downwardly from a base floor 74 of the cupholder base 24 and extends circumferentially around the vertical axis 38 of the cupholder base 24. The pair of retainer tabs 42, 44 are arranged to lie on opposite sides of the mount ring 40 from one another. The pair of retainer tabs 42, 44 are spaced apart vertically below the base floor 74 and extend radially outward away from the vertical axis 38.

The mount aperture 46 formed in the cupholder support 18 is shaped to correspond with the cupholder mount 22 so that the cupholder mount 22 can be inserted therethrough as suggested in FIG. 5. The mount aperture 46 has a central portion 47 which corresponds with the mount ring 40 and a pair of lateral portions 49, 51 which correspond to the retainer tabs 42, 44. The cupholder mount 22 is configured to be inserted in the mount aperture while the retainer tabs 42, 44 are aligned with the lateral portions 49, 51. Once inserted into the mount aperture 46 as shown in FIG. 6, the cupholder base 24 may be rotated about vertical axis 38 so that the retainer tabs 42, 44 pass under portions of the cupholder support 18 and block vertical motion of the cupholder 20 away from the cupholder support 18. In the illustrative embodiment, the cupholder mount 22 and the cupholder base 24 are rotated 90 degrees to secure the cupholder 20 to the cupholder support. The cupholder mode-changer 25 is free to rotate about vertical axis 38 before and after the cupholder 20 is secured to the cupholder support 18. One example of a suitable cupholder support and cupholder mount is shown and described in U.S. Pat. No. 10,023,092, filed on Oct. 28, 2016, which is expressly incorporated herein in its entirety for the purpose of describing a cupholder support and a cupholder mount.

The cupholder base 24 includes a base rim 70, a base sidewall 72 extending downwardly from the base rim 70, and a base floor 74 coupled to a lower end of the base sidewall 72 and an upper end of the cupholder mount 22 as shown in FIGS. 5-10. The base rim 70 forms an upper end of the cupholder base 24 and extends only partway around the vertical axis 38. The base sidewall 72 includes a lower sidewall ring 76 coupled to the base floor 74 and at least one sidewall panel 78 extending between and interconnecting the base rim 70 and the lower sidewall ring 76. The lower sidewall ring 76 extends annularly around the vertical axis 38.

Each sidewall panel 78 has a pair of circumferential sidewall edges 80, 82 that are spaced apart circumferentially from one another to provide one or more vertical slots 30, 32 in the base sidewall 72. The vertical slots 30, 32 are open in a vertical direction adjacent to base rim 70 and extend downwardly to an upper end of the lower sidewall ring 76. When the cupholder mode-changer 25 is oriented in the handle-receiving mode, the vertical slots 30, 32 are unobstructed so that a handle of a container can be dropped downwardly into one of the slots 30, 32 as the container is placed in the cupholder 20.

The cupholder base 24 and the cupholder mode-changer 25 are configured to cooperate with one another to provide means for establishing the continuous cupholder sidewall 27 that extends circumferentially around the vertical axis 38 of the cupholder 20 when the cupholder 20 is in the volume-maximizing mode as shown in FIG. 7. The cupholder base 24 and the cupholder mode-changer 25 are also configured to cooperate with one another to provide means for establishing a handle-receiving space 31, 35 in the cupholder sidewall 27 after movement of the cupholder mode-changer 25 relative to the cupholder base 24 to arrange the cupholder 20 in the handle-receiving mode as shown in FIG. 8.

The cupholder mode-changer 25 includes a cupholder insert 28 sized to fit within the interior container-receiving space 26 of the cupholder base 24 and an insert mount 50 configured to attach to the cupholder base 24 to retain the cupholder insert 28 to the cupholder base 24 as shown in FIGS. 4 and 9. The cupholder insert 28 includes an insert rim 54, an insert sidewall 56 extending downwardly from the insert rim 54 and arranged substantially parallel to the base sidewall 72, and an insert floor 58 coupled to a lower end of the insert sidewall 56. The insert rim 54 is rolled to extend over the base rim 70 of the cupholder base 24 and downwardly along an exterior surface of the base sidewall 72 at least when the cupholder 20 is in the handle-receiving mode. The insert sidewall 56 is formed to include a second pair of opposing slots 34, 36. The slots 34, 36 are open in a vertical direction through insert rim 54 such that insert rim 54 and insert sidewall 56 extend only partway around vertical axis 38. The slots 34, 36 extend all the way from the insert rim 54 to the insert floor 58 in the illustrative embodiment; however, in other embodiments, the slots 34, 36 may not extend all the way to the insert floor 58.

The cupholder insert 28 is configured to rotate relative to the cupholder base 24 about the vertical axis 38 to change the cupholder from the volume-maximizing mode to the handle-receiving mode. In the volume-maximizing mode, each of the first pair of opposing slots 30, 32 is offset circumferentially from each of the second pair of opposing slots 34, 36 and the sidewalls 56, 72 establish the continuous sidewall 27 which extends entirely around vertical axis 38. In the handle-receiving mode, the first and second pairs of opposing slots are aligned circumferentially with one another to provide first and second handle-receiving spaces 31, 35 in the cupholder sidewall 27.

The insert mount 50 includes a mount post 84 coupled to a bottom surface of the insert floor 58 and a mount head 86 coupled to a distal end of the mount post 84 as shown in FIG. 9. The mount head 86 has a greater width than the mount post 84. The base floor 74 is formed to include a mount aperture 88 that is arranged along the vertical axis 38. The insert mount 50 is configured extend through the mount aperture 88 to attach the cupholder insert 28 to the cupholder base 24. The mount ring 40 extends circumferentially around the vertical axis 38 and the mount aperture 88 to provide a hollow cavity 90 below the base floor 74 and radially inward of the mount ring 40. The hollow cavity 90 receives the mount head 86 of the insert mount 50.

In some embodiments, the cupholder 20 includes a cupholder mount 22 configured to retain the cupholder 20 to the cupholder support 18 and a cupholder base 24 defining an interior space 26. The cupholder 20 further includes a cupholder insert 28 sized to fit within the interior space 26 of the cupholder base 24. The cupholder insert 28 is adapted to receive a cup, bottle, or another vessel holding a product for consumption by a child seated in the juvenile seat 10. The cupholder base 24 is formed to include a pair of opposing slots 30, 32. The cupholder insert 28 is also formed to include a pair of opposing slots 34, 36. The slots 30, 32 of the cupholder base 24 can be aligned with the pair of slots 34, 36 of the cupholder insert 28. The cupholder insert 28 may be separated from the cupholder base 24 to be cleaned separately from one another.

In some embodiments, the cupholder insert 28 is rotatable about a vertical axis 38 relative to the cupholder base 24. The cupholder insert 28 is rotatable about the vertical axis 38 to open or unobstruct the pair of slots 30, 32 formed in the cupholder base 24 when a cup with a handle is used with the cupholder 20 and to close or obstruct the pair of slots 30, 32 formed in the cupholder base 24 when desired. In the illustrative embodiment, the cupholder base 24 and the cupholder insert 28 include only two slots each such that a 90 degree rotation of the cupholder insert opens or closes the slots 30, 32 in the cup holder base. However, in other embodiments, both the cupholder base 24 and the cupholder insert 28 can have any number of slots formed therein.

In some embodiments, the cupholder insert 28 includes an insert mount 50, a sidewall 56 with edges defining the slots 34, 36 and a rolled brim 54. The insert mount 50 may snap into a corresponding aperture formed in the cupholder base 24 to fix the cupholder insert 28 to the cupholder base 24. The rolled brim 54 wraps around an upper edge of the cupholder base 24 when fully installed. The rolled brim 54 may also snap onto the upper edge of the cupholder base 24.

In some embodiments, the cupholder mount 22 includes an attachment post 40 coupled to a bottom of the cupholder base 24, and a pair of retainer tabs 42, 44 coupled to a distal end of the attachment post 40 spaced apart from the cupholder base 24. The attachment post 40 is arranged along the vertical axis 38. The retainer tabs 42, 44 extend radially outwardly from the vertical axis in opposite directions. The retainer tabs 42, 44 are arranged to extend into an aperture 46 formed in the cupholder support 18. The aperture 46 has a shape that corresponds to a cross section of the retainer tabs 42, 44. The cup holder base 24 is locked in place with the cupholder support 18 by rotating the cup holder base 24 about the vertical axis 38 relative to the cup holder support 18 after the retainer tabs 42, 44 have been inserted into aperture 46.

In some embodiments, the cupholder insert 28 further includes a pair of detent domes (also called protrusions) 60, 62 on an lower surface facing toward the cupholder base 24 as shown in FIG. 5. The cupholder base 24 is formed to include a plurality of detent apertures or notches 66A, 66B, 66C, 66D. The detent apertures 66A, 66B, 66C, 66D are spaced circumferentially from one another about 90 degrees apart. Two of the detent apertures 66A, 66B are aligned with respective slots 30, 32 formed in cupholder base 24 while the remaining two detent apertures 66C, 66D are spaced 90 degrees from a center of slots 30, 32. Detent domes 60, 62 are aligned with slots 34, 36 formed in cupholder insert 28. Detent domes 60, 62 extend into detent apertures 66C, 66D in the closed position and into detent apertures 66A, 66B in the opened position to retain cupholder insert 28 in these positions. Any number of domes and apertures may be used to provide a detent function. The locations of the domes 60, 62 and the apertures 66A, 66B, 66C, 66D may be switched in some embodiments.

The following numbered clauses include embodiments that are contemplated and non-limiting:

Clause 1. A juvenile seat comprising a seat bottom, a cupholder support coupled to the seat bottom, and a cupholder coupled removably to the cupholder support, wherein the cupholder includes a cupholder mount configured to retain the cupholder to the cupholder support and a cupholder base defining an interior space adapted to receive a cup or bottle.

Clause 2. The juvenile seat of clause 1, wherein the cupholder further includes a cupholder insert sized to fit within the interior space of the cupholder base.

Clause 3. The juvenile seat of clause 2, wherein the cupholder base is formed to include a pair of opposing slots and the cupholder insert is formed to include a pair of opposing slots than can be aligned with the pair of slots of the cupholder base.

Clause 4. The juvenile seat of clause 3, wherein the cupholder insert is rotatable relative to the cupholder base to open the pair of slots formed in the cupholder base when a cup with a handle is used with the cupholder and to close the pair of slots formed in the cupholder base.

Clause 5. The juvenile seat of clause 1, wherein the cupholder mount includes an attachment post coupled to a bottom of the cupholder base, the attachment post arranged to extend into an aperture formed in the cupholder support and to lock the cupholder to the cupholder support when the attachment post is inserted in the aperture and rotated relative to the cupholder support to a locked position (i.e. 90 degrees).

The invention claimed is:

1. A juvenile seat comprising
a cupholder support formed to include a mount aperture, and
a cupholder coupled to the cupholder support, the cupholder including: (i) a cupholder mount arranged to extend into the mount aperture to interlock with the cupholder support and retain the cupholder to the cupholder support, (ii) a cupholder base having a base rim, a base sidewall extending downwardly from the base rim, and a base floor coupled to a lower end of the base sidewall and an upper end of the cupholder mount, the base sidewall at least partially defining an interior container-receiving space located radially inward from the base rim and the base sidewall and above the base floor, and (iii) a cupholder mode-changer coupled to the cupholder base and configured to move relative to the cupholder base to change the cupholder from a volume-maximizing mode to a handle-receiving mode, wherein the cupholder base and the cupholder mode-changer are configured to cooperate with one another to provide means for establishing a cupholder sidewall that extends circumferentially around a vertical axis of the cupholder when the cupholder is in the volume-maximizing mode and for establishing a handle-receiving space in the cupholder sidewall after movement of the cupholder mode-changer relative to the cupholder base to arrange the cupholder in the handle-receiving mode so that a container having a handle can be received within the interior container-receiving space while the handle of the container extends radially outward past the cupholder sidewall and into the handle-receiving space, wherein the cupholder mode-changer includes a cupholder insert with at least a portion sized to fit within the interior container-receiving space of the cupholder base and an insert mount configured to attach to the cupholder base to retain the cupholder insert to the cupholder base, wherein the insert mount includes a mount post coupled to a bottom surface of the insert floor and a mount head coupled to a distal end of the mount post and having a greater width than the mount post, wherein the base floor is formed to include a mount aperture that is arranged along the vertical axis and the insert mount is configured to extend through the mount aperture of the base floor to attach the cupholder insert to the cupholder base, and wherein the cupholder mount includes a mount ring and a plurality of retainer tabs that extend radially outward from the mount ring, and wherein the mount ring extends circumferentially around the vertical axis and the mount aperture of the base floor to provide a hollow cavity below the base floor and radially inward of the mount ring that receives the mount head of the insert mount.

2. The juvenile seat of claim 1, wherein the cupholder insert includes an insert rim, an insert sidewall extending downwardly from the insert rim and arranged substantially parallel to the base sidewall, and an insert floor coupled to a lower end of the insert sidewall.

3. The juvenile seat of claim 2, wherein the insert rim is rolled to extend over the base rim of the cupholder base and downwardly along an exterior surface of the base sidewall at least when the cupholder is in the handle-receiving mode.

4. The juvenile seat of claim 2, wherein the base sidewall is formed to include a first pair of opposing slots and the insert sidewall is formed to include a second pair of opposing slots.

5. The juvenile seat of claim 4, wherein the cupholder insert is configured to rotate relative to the cupholder base about the vertical axis to change the cupholder from the volume-maximizing mode, in which each of the first pair of opposing slots is offset circumferentially from each of the second pair of opposing slots, and the handle-receiving mode, in which the first and second pairs of opposing slots are aligned circumferentially with one another to provide first and second handle-receiving spaces in the cupholder sidewall.

6. The juvenile seat of claim 1, wherein the base sidewall is formed to include a slot and the cupholder mode-changer is configured to pivot relative to the cupholder base about the vertical axis to change the cupholder from the volume-maximizing mode, in which the cupholder mode-changer overlies the slot to cooperate with the base sidewall to provide the cupholder sidewall, and the handle-receiving mode, in which the cupholder mode-changer is offset circumferentially from the slot to provide the handle-receiving space in the cupholder sidewall.

7. The juvenile seat of claim 1, wherein the cupholder mode-changer includes a detent protrusion and the cupholder base is formed to include a detent aperture, and wherein the detent protrusion is configured to extend into the detent aperture when the cupholder is in the handle-receiving mode to block movement of the cupholder mode-changer to the volume-maximizing mode.

8. The juvenile seat of claim 7, wherein the cupholder mode-changer further includes a second detent protrusion and the cupholder base is formed to include a second detent aperture, and wherein the second detent protrusion is configured to extend into the second detent aperture when the cupholder is in the volume-maximizing mode to block movement of the cupholder mode-changer to the handle-receiving mode.

9. A juvenile seat comprising
a cupholder support and
a cupholder coupled to the cupholder support, the cupholder including: (i) a cupholder mount coupled to the cupholder support, (ii) a cupholder base at least partially defining an interior container-receiving space, and (iii) a cupholder mode-changer coupled to the cupholder base and configured to move relative to the cupholder base to change the cupholder from a volume-maximizing mode to a handle-receiving mode, wherein the cupholder base and the cupholder mode-changer are configured to cooperate with one another to establish a cupholder sidewall that extends circumferentially around a vertical axis of the cupholder when the cupholder is in the volume-maximizing mode and to establish a handle-receiving space in the cupholder sidewall after movement of the cupholder mode-changer relative to the cupholder base to arrange the cupholder in the handle-receiving mode, wherein the cupholder mode-changer includes a cupholder insert sized to fit within the interior container-receiving space of the cupholder base and an insert mount configured to attach to the cupholder base to retain the cupholder insert to the cupholder base, wherein the cupholder insert includes an insert rim, an insert sidewall extending downwardly from the insert rim, and an insert floor coupled to a lower end of the insert sidewall, and wherein the insert rim is rolled to extend downwardly along an exterior surface of the cupholder base at least when the cupholder is in the handle-receiving mode.

10. The juvenile seat of claim 9, wherein the cupholder base is formed to include a first pair of opposing slots and the insert sidewall is formed to include a second pair of opposing slots.

11. The juvenile seat of claim 10, wherein the cupholder insert is configured to rotate relative to the cupholder base about the vertical axis to change the cupholder from the volume-maximizing mode, in which each of the first pair of opposing slots is offset circumferentially from each of the second pair of opposing slots, and the handle-receiving mode, in which the first and second pairs of opposing slots are aligned circumferentially with one another to provide first and second handle-receiving spaces in the cupholder sidewall.

12. The juvenile seat of claim 9, wherein the insert mount includes a mount post coupled to a bottom surface of the insert floor and a mount head coupled to a distal end of the mount post and having a greater width than the mount post, wherein the cupholder base is formed to include a mount aperture that is arranged along the vertical axis and the insert mount is configured extend through the mount aperture to attach the cupholder insert to the cupholder base.

13. The juvenile seat of claim 9, wherein the cupholder base is formed to include a slot and the cupholder mode-changer is configured to pivot relative to the cupholder base about the vertical axis to change the cupholder from the volume-maximizing mode, in which the cupholder mode-changer overlies the slot to cooperate with the cupholder base to provide the cupholder sidewall, and the handle-receiving mode, in which the cupholder mode-changer is offset circumferentially from the slot to provide the handle-receiving space in the cupholder sidewall.

14. A juvenile seat comprising
a cupholder support and
a cupholder coupled to the cupholder support, the cupholder including: (i) a cupholder mount coupled to the cupholder support, (ii) a cupholder base at least partially defining an interior container-receiving space, and (iii) a cupholder mode-changer coupled to the cupholder base and configured to move relative to the cupholder base to change the cupholder from a volume-maximizing mode to a handle-receiving mode,
wherein the cupholder base and the cupholder mode-changer are configured to cooperate with one another to establish a cupholder sidewall that extends circumferentially around a vertical axis of the cupholder when the cupholder is in the volume-maximizing mode and to establish a handle-receiving space in the cupholder sidewall after movement of the cupholder mode-changer relative to the cupholder base to arrange the cupholder in the handle-receiving mode,
wherein the cupholder mode-changer includes a cupholder insert with at least a portion sized to fit within the interior container-receiving space of the cupholder base and an insert mount configured to attach to the cupholder base to retain the cupholder insert to the cupholder base,
wherein the insert mount includes a mount post coupled to a bottom surface of the insert floor and a mount head coupled to a distal end of the mount post and having a greater width than the mount post,
wherein the base floor is formed to include a mount aperture that is arranged along the vertical axis and the insert mount is configured to extend through the mount aperture to attach the cupholder insert to the cupholder base, and
wherein the cupholder mount includes a mount ring and a plurality of retainer tabs that extend radially outward from the mount ring, and wherein the mount ring extends circumferentially around the vertical axis and the mount aperture to provide a hollow cavity below the base floor and radially inward of the mount ring that receives the mount head of the insert mount.

15. The juvenile seat of claim 14, wherein the cupholder insert includes an insert rim, an insert sidewall extending downwardly from the insert rim, and an insert floor coupled to a lower end of the insert sidewall, and wherein the insert rim is rolled to extend downwardly along an exterior surface of the cupholder base at least when the cupholder is in the handle-receiving mode.

16. The juvenile seat of claim 14, wherein the cupholder base is formed to include a first pair of opposing slots and the insert sidewall is formed to include a second pair of opposing slots.

17. The juvenile seat of claim 16, wherein the cupholder insert is configured to rotate relative to the cupholder base within the interior container-receiving space about the vertical axis to change the cupholder from the volume-maximizing mode, in which each of the first pair of opposing slots is offset circumferentially from each of the second pair of opposing slots, and the handle-receiving mode, in which the first and second pairs of opposing slots are aligned circumferentially with one another to provide first and second handle-receiving spaces in the cupholder sidewall.

18. The juvenile seat of claim 14, wherein the base sidewall is formed to include a slot and the cupholder mode-changer is configured to pivot relative to the cupholder base about the vertical axis to change the cupholder from the volume-maximizing mode, in which the cupholder mode-changer overlies the slot to cooperate with the base sidewall to provide the cupholder sidewall, and the handle-receiving mode, in which the cupholder mode-changer is offset circumferentially from the slot to provide the handle-receiving space in the cupholder sidewall.

19. The juvenile seat of claim 14, wherein the cupholder mode-changer includes a detent protrusion and the cupholder base is formed to include a detent aperture, and wherein the detent protrusion is configured to extend into the detent aperture when the cupholder is in the handle-receiving mode to block movement of the cupholder mode-changer to the volume-maximizing mode.

* * * * *